United States Patent Office 3,766,260
Patented Oct. 16, 1973

3,766,260
TERTIARY AMINOACIDS
Richard William James Carney, New Providence, and George de Stevens, Summit, N.J., assignors to Ciba-Geigy Corporation, Ardsley, N.Y.
No Drawing. Continuation-in-part of application Ser. No. 792,755, Jan. 21, 1969, which is a continuation-in-part of application Ser. No. 757,136, Sept. 3, 1968, now Patent No. 3,657,230, which in turn is a continuation-in-part of abandoned application Ser. No. 716,347, Mar. 27, 1968. This application Sept. 29, 1969, Ser. No. 862,014
Int. Cl. C07c 101/44
U.S. Cl. 260—518 R
2 Claims

ABSTRACT OF THE DISCLOSURE

New α-(tert. arylaminophenyl)-aliphatic acids, e.g. those of the formula

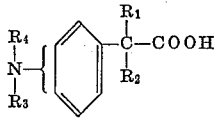

$R_1$=H or alkyl,
$R_2$=H, alk(en)yl, cycloalk(en)yl or cycloalk(en)yl-alkyl,
$R_3$=alk(en)yl, hydroxyalkyl, alkoxyalkyl, aminoalkyl, cycloalk(en)yl or cycloalk(en)yl-alkyl,
$R_4$=aryl, and functional derivatives thereof, are anti-inflammatory agents.

CROSS-REFERENCES TO RELATED APPLICATIONS

This is a continuation-in-part of application Ser. No. 792,755, filed Jan. 21, 1969, which in turn is a continuation-in-part of application Ser. No. 757,136, filed Sept. 3, 1968, now Pat. No. 3,657,230, which in turn is a continuation-in-part of application Ser. No. 716,347, filed Mar. 27, 1968, now abandoned.

SUMMARY OF THE INVENTION

The present invention concerns and has for its object the provision of new α-(tert. arylaminophenyl)-aliphatic acids of the Formula I

in which $R_1$ is hydrogen or lower alkyl, $R_2$ is hydrogen, lower alkyl, alkenyl, cycloalkyl, cycloalkenyl, cycloalkyl-alkyl or cycloalkenyl-alkyl, Ph is a 1,3- or 1,4-phenylene radical, $R_3$ is lower alkyl alkenyl, hydroxyalkyl, alkoxyalkyl, aminoalkyl, cycloalkyl, cycloalkenyl, cycloalkyl-alkyl or cycloalkenyl-alkyl, wherein hetero-atoms are separated from the nitrogen atom by at least 2 carbon atoms, and $R_4$ is an aryl radical, of therapeutically acceptable functional acid or amino derivatives thereof, and of corresponding pharmaceutical compositions and of methods for the preparation and application of these products. Said compositions are useful anti-inflammatory agents in the treatment or management of arthritic and dermatopathologic conditions.

DESCRIPTION OF THE PREFERRED EMBODIMENT

The lower alkyl radicals $R_1$ to $R_3$ represent, for example, methyl, ethyl, n- or i-propyl, -butyl, -pentyl, -hexyl or -heptyl. A lower alkenyl radical $R_2$ or $R_3$ is, for example, vinyl, allyl, methallyl, 3-butenyl or 1-pentenyl. The term "lower," referred to above and hereinafter in connection with organic radicals or compounds respectively, defines such with up to 7, preferably up to 4, carbon atoms.

A lower alkoxy-lower alkyl radical $R_3$ is, for example, 2-(methoxy, ethoxy, n- or i-propoxy)-ethyl or -propyl, 3-(methoxy or ethoxy)-propyl or 4-methoxybutyl. An aminoalkyl group $R_3$ is, for example (amino, mono- or di-lower alkylamino, lower alkylene-imino or monoaza-, monoxa-, or monothia-lower alkyleneimino)-lower alkyl, e.g. ω-(amino, ethylamino, dimethylamino, pyrrolidino, piperidino, piperazino, 4-methylpiperazino, morpholino or thiamorpholino)-ethyl, -propyl or -butyl.

A cycloalkyl or cycloalkenyl radical $R_2$ or $R_3$ is preferably 3 to 7 ring-membered and unsubstituted or substituted by up to 4 lower alkyls, such as cyclopropyl, 1- or 2-methyl-cyclopropyl, 1,2-, 2,2- or 2,3-dimethyl-cyclopropyl, 1,2,2- or 1,2,3-trimethylcyclopropyl or 2,2,3,3-tetramethyl-cyclopropyl, cyclobutyl, 3,3-dimethyl-cyclobutyl or 2,2,3-trimethyl-cyclobutyl, cyclopentyl, 2- or 3-methyl-cyclopentyl, 2,5- or 3,4-dimethyl-cyclopentyl, cyclohexyl, 2-, 3- or 4-methyl-cyclohexyl, 2,3-, 2,4- or 3,5-dimethyl-cyclohexyl or 2,4,6-trimethyl-cyclohexyl or cycloheptyl; 2-cyclopropenyl, 2,3-dimethyl-2-cyclopropenyl, 1-, 2- or 3-cyclopentenyl or -cyclohexenyl, 2- or 3-methyl-2-cyclopentenyl, 3,4-dimethyl-3-cyclopentenyl or 2-, 3- or 4-methyl-1 or 2-cyclohexenyl. A cycloalkyl-lower alkyl or cycloalkenyl-lower alkyl radical $R_2$ or $R_3$ is one of the above-mentioned lower alkyl groups, preferably such with up to 4 carbon atoms, having in any position thereof, preferably at the terminal carbon atom, one of said cycloalkyl or cycloalkenyl radicals attached, e.g. cyclopropyl-methyl, 2-cyclopentylethyl or 3-cyclopentenylmethyl.

The phenylene radical Ph, carrying the tertiary amino group

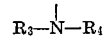

in the 3- or preferably 4-position, is unsubstituted or substituted in the remaining positions by one or more than one, preferably one or two, of the same or different suitable substituents selected, for example, from lower alkyl, e.g. methyl, ethyl, n- or i-propyl or -butyl, free etherified or esterified hydroxy or mercapto, such as lower alkoxy or lower alkylmercapto, e.g. methoxy, ethoxy, n- or i-propoxy or -butoxy, methylmercapto or ethylmercapto, halogeno, e.g. fluoro, chloro or bromo, trifluoromethyl, nitro, amino, di-lower alkylamino or lower alkanoyl-amino, e.g. dimethylamino, N-methyl-N-ethylamino, diethylamino, di-n- or i-propylamino or -butylamino; acetyl-amino or pivaloylamino, furthermore cyano, carbamoyl, di-lower alkylcarbamoyl, carboxy, lower alkylsulfonyl, sulfo, sulfamoyl or di-lower alkylsulfamoyl, e.g. N,N-dimethylcarbamoyl or -sulfamoyl, methyl- or ethylsulfonyl. More particularly, the phenylene radical Ph represents especially 1,3- or 1,4-phenylene, but also (lower alkyl)-1,3- or 1,4-phenylene, (lower alkoxy)-1,3- or 1,4-phenylene, (halogeno)-1,3- or 1,4-phenylene, (trifluoromethyl)-1,3- or 1,4-phenylene, (amino)-1,3- or 1,4-phenylene or (di-lower alkylamino)-1,3- or 1,4-phenylene.

The aryl radical $R_4$ is preferably a monocyclic iso- or heterocyclic aryl radical, such as an unsubstituted or substituted phenyl, pyridyl, furyl or thiophenyl radical wherein the substituents are those shown above for Ph. A preferred aryl radical $R_4$ is the HPh moiety, especially phenyl, (lower alkyl)-phenyl, (lower alkoxy)-phenyl, (halogeno)-phenyl, (trifluoromethyl)-phenyl, (amino)-phenyl or (di-lower alkylamino)-phenyl.

In view of the above, the tertiary amino group

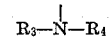

represents, for example, N-(lower alkyl, lower alkenyl, lower hydroxyalkyl, lower alkoxy-lower alkyl, amino-lower alkyl, mono- or di-lower alkylamino-lower alkyl, lower alkyleneimino-lower alkyl, monoaza, -oxa- or -thia-lower alkyleneimino-lower alkyl, 3 to 7-ring-membered cycloalkyl, cycloalkenyl, cycloalkyl-lower alkyl or cycloalkenyl-lower alkyl)-N-HPh-amino, e.g. N-(methyl, ethyl, n- or i-propyl, allyl, methallyl, 3-butenyl, 2-hydroxyethyl, 2-methoxyethyl, 3-aminopropyl, 2-ethylaminoethyl, 3-dimethylaminopropyl, 2-pyrrolidinoethyl, 2-piperazinoethyl, 2-morpholinoethyl, cyclopropyl, cyclopentyl, cyclohexyl, 3 - cyclopentyl, 2 - cyclohexenyl, cyclopropyl - methyl, 2-cyclopentylethyl or 3-cyclopentenylmethyl) - N - (phenyl, tolyl, anisyl, chlorophenyl, trifluoromethylphenyl, aminophenyl or dimethylaminophenyl)-amino.

Functional derivatives of the acids of Formula I are preferably their esters, for example, their lower alkyl, lower alkenyl, 3 to 7 ring-membered cycloalkyl, cycloalkenyl, cycloalkyl-lower alkyl or cycloalkenyl-lower alkyl, aryl or aralkyl esters, e.g. the HPh or HPh-lower alkyl esters, free or etherified hydroxy-lower alkyl, e.g. lower alkoxy- or 3 to 7 ring-membered cycloalkoxy-lower alkyl or acylic or cyclic tert. amino-lower alkyl esters, wherein the tertiary amino group represents, for example, di-lower alkylamino or lower alkyleneimino, e.g. dimethylamino, diethylamino, pyrrolidino or piperidino, or monoaza-, monooxa- or monothia-lower alkyleneimino, such as piperazino, 4-lower alkylpiperazino, e.g. 4-(methyl or ethyl)-piperazino, morpholino or thiamorpholino. Other functional derivatives of the acids of Formula I are, for example, unsubstituted or substituted amides or thioamides, e.g. mono- or di-lower alkylamides, HPh-amides, HPh-lower alkylamides, monocyclic lower alkyleneamides, monoaza-, monooxa- or monothia-lower alkyleneamides, furthermore the corresponding thioamides, hydroxamic acids, nitriles, ammonia or metal salts. Amino derivatives are the N-oxide, lower alkyl- or HPh-lower alkyl quaternaries and acid addition salts.

The compounds of the invention possess valuable pharmacological properties. For example, they exhibit anti-inflammatory effects, as can be demonstrated in animal tests, using advantageously mammals, such as rats, as test objects. Such tests can be performed, for example, according to Winter et al., Proc. Soc. Exp. Biol. & Med., 111, 544 (1962). According to it, the compounds of the invention are applied, in the form of aqueous solutions or suspensions, which may contain carboxymethylcellulose or polyethylene glycol as solubilizers, by stomach tube to male and female mature rats, in the dosage range between about 0.1 and 75 mg./kg./day, preferably between about 0.5 and 50 mg./kg./day, advantageously between about 1 and 25 mg./kg./day. About 1 hour later 0.06 ml. of a 1% aqueous saline suspension of carrageenin is injected into the rat's left hind paw and 3–4 hours subsequently any anti-inflammatory activity can be expressed by the difference of the volume and/or weight of the edematous left paw and that of the right paw, as compared with said difference estimated from untreated control animals. According to the adjuvant arthritis test, male rats are sensitized with 0.05 ml. of said 1% carrageenin suspension, applied under ether anesthesia to all four paws. After 24 hours 0.1 ml. of a 1% suspension of M. butyricum is injected intradermally into the tail and 7 days later the compounds of the invention are applied as shown above for a 14 day period. The rats are weighed once weekly and the secondary arthritic lesions scored 3 times a week as to number and severity. The results obtained are compared with those of untreated arthritic rats. In view of the test results obtained, the compounds of the invention are useful anti-inflammatory agents in the treatment or management of arthritic and dermatopathologic conditions. They are also useful intermediates in the preparation of other valuable products, preferably of pharmacologically active compounds.

Preferred compounds of the invention are those of Formula I in which $R_1$ is hydrogen or lower alkyl, $R_2$ is hydrogen, lower alkyl, lower alkenyl or 3 to 7 ring-membered cycloalkyl, cycloalkenyl, cycloalkyl-lower alkyl or cycloalkenyl-lower alkyl, Ph is unsubstituted 1,3- or 1,4-phenylene or such phenylene substituted by one or two members selected from the group consisting of lower alkyl, hydroxy, mercapto, lower alkoxy, lower alkylmercapto, halogeno, trifluoromethyl, nitro, amino, di-lower alkylamino, lower alkanoylamino, cyano, carbamoyl, di-lower alkyl-carbamoyl, carboxy, lower alkylsulfonyl, sulfo, sulfamoyl or di-lower alkyl-sulfamoyl, $R_3$ is lower alkyl, lower alkenyl, hydroxylower alkyl, lower alkoxy-lower alkyl, amino-lower alkyl, mono- or di-lower alkylamino-lower alkyl, lower alkyleneimino-lower alkyl, monoaza-, -oxa- or -thia-lower alkyleneimino-lower alkyl, 3 to 7-ring-membered cycloalkyl, cycloakenyl, cycloalkyl-lower alkyl or cycloalkenyl-lower alkyl, and $R_4$ is unsubstituted phenyl or phenyl substituted by one or two members selected from the group consisting of lower alkyl, hydroxy, mercapto, lower alkoxy, lower alkylmercapto, halogeno, trifluoromethyl, nitro, amino, di-lower alkylamino, lower alkanoylamino, cyano, carbamoyl, di-lower alkyl-carbamoyl, carboxy, lower alkylsulfonyl, sulfo, sulfamoyl or di-lower alkyl-sulfamoyl, as well as a lower alkyl ester, lower alkenyl ester, 3 to 7 ring-membered cycloalkyl ester, cycloalkenyl ester, cycloalkyl-lower alkyl ester, cycloalkenyl-lower alkyl ester, HPh-ester, HPh-lower alkyl ester, hydroxy-lower alkyl ester, lower alkoxy-lower alkyl ester, di-lower alkylamino-lower alkyl ester, lower alkyleneimino-lower alkyl ester or monoaza-, monooxa- or monothia-lower alkyleneimino-lower alkyl ester thereof, wherein 2 hetero atoms are separated from each other by at least 2 carbon atoms, the amide, thioamide, a mono- or di-lower alkylamine, mono- or di-lower alkyl-thioamide, lower alkyleneamide, lower alkylene-thioamide, HPh-amide, HPh-thioamide, HPh-lower alkylamide, HPh-lower alkyl-thioamide, morpholide, thiamorpholide or hydroxamic acid thereof, the N-oxide, a lower alkyl quaternary, HPh-lower alkyl quaternary or a therapeutically useful salt of these compounds.

Particularly useful are the compounds of Formula I, in which $R_1$ is hydrogen or lower alkyl, $R_2$ is hydrogen, lower alkyl, 3- to 7-ring-membered cycloalkyl or mono- or di-(lower alkyl)-cycloalkyl, Ph is 1,3- or 1,4-phenylene, (lower alkyl)-1,3- or 1,4-phenylene, (lower alkoxy)-1,3- or 1,4-phenylene, (halogeno)-1,3- or 1,4-phenylene, (trifluoromethyl)-1,3- or 1,4-phenylene or (di-lower alkylamino)-1,3- or 1,4-phenylene, $R_3$ is lower alkyl, lower alkenyl, hydroxy-lower alkyl or lower alkoxy-lower alkyl and $R_4$ is phenyl, (lower alkyl)-phenyl, (lower alkoxy)-phenyl, (halogeno) - phenyl, (trifluoromethyl) - phenyl, (amino)-phenyl or (di-lower alkylamino)-phenyl, a lower alkyl ester, the amide, a mono- or di-lower alkylamide, the ammonium salt, an alkali metal or alkaline earth metal salt or a therapeutically useful acid addition salt of these compounds.

Preferred compounds of the invention are those of Formula II

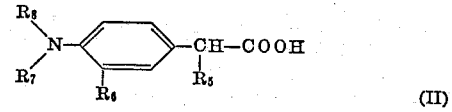

(II)

in which $R_5$ is hydrogen, lower alkyl or unsubstituted 3 to 6 ring-membered cycloalkyl, $R_6$ is hydrogen, lower alkyl, lower alkoxy, halogeno or trifluoromethyl, $R_7$ is lower alkyl and $R_8$ is phenyl, (lower alkyl)-phenyl, (lower alkoxy)-phenyl, (halogeno)-phenyl, (trifluoromethyl)-phenyl, (amino)-phenyl or (di-lower alkylamino)-phenyl, a lower alkyl ester, the ammonium salt, an alkali metal salt or a therapeutically useful acid addition salt thereof.

Especially valuable are compounds of the Formula II, in which $R_5$ is hydrogen, methyl, ethyl or cyclopropyl, $R_6$ is hydrogen or chloro, $R_7$ is methyl or ethyl and $R_8$ is phenyl, tolyl, anisyl or chlorophenyl, or the methyl or ethyl ester, the ammonium salt, an alkali metal salt or a therapeutically useful acid addition salt thereof.

The compounds of this invention are prepared according to methods known per se. For example, they are obtained by:

(a) Converting in a compound of the Formula III

  (III)

in which $X_1$ is a substituent capable of being converted into the free or functionally converted

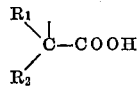

moiety, $X_1$ into said moiety or (b) Converting in a compound of the Formula IV

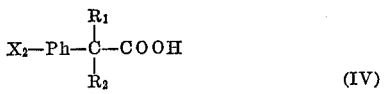  (IV)

or a functional derivative thereof, in which $X_2$ is a substituent capable of being converted into

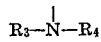

$X_2$ into said tertiary phenylamino group and, if desired, converting any resulting compound into another compound of the invention.

According to process (a), the compounds of the invention are prepared either by ($\alpha$) introduction of the whole free or functionally converted acid moiety

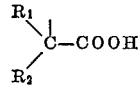

or any part thereof (preferably the carboxylic function), into compounds of Formula III, or by ($\beta$) liberation of acid moiety from a suitable group containing already the required number of carbon atoms, i.e. the liberation of a potential carboxy or alkylidene moiety.

Accordingly, the simplest substituent $X_1$ is a hydrogen atom, a metallic group or a reactively esterified hydroxy group. The former is, for example, an alkali metal, e.g. a lithium atom, or a substituted alkaline earth metal, zinc or cadmium atom, such as halomagnesium or lower alkyl zinc or cadmium, e.g. chloro-, bromo- or iodomagnesium, methyl or ethyl zinc or cadmium. A reactively esterified hydroxy group is preferably such derived from a strong mineral or sulfonic acid, such as a hydrohalic, sulfuric, lower alkane or benzene sulfonic acid, e.g. hydrochloric, hydrobromic, methane-, ethane-, benzene- or p-toluenesulfonic acid. The corresponding starting material of Formula III is reacted with the acid having the formula

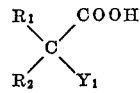

or a suitable derivative, e.g. a corresponding salt, ester, amide or nitrile thereof, in which formulae one of $X_1$ and $Y_1$ is the above-described metallic group and the other reactively esterified hydroxy group, or $X_1$ is hydrogen and $Y_1$ is a free or reactively esterified hydroxy group. Such reaction is performed according to the classical Grignard or Friedel-Crafts syntheses, in which a new carbon-carbon bond is formed from separate reactants. The latter synthesis is performed in the presence of a Lewis acid, such as an aluminum, boron, antimony V, ferric or zinc salt, e.g. the chlorides thereof, or hydrofluoric, sulfuric or preferably polyphosphoric acid, which latter agent is advantageously used with the above glycolic acids or either derivatives, i.e. those in which $Y_1$ is hydroxy. In case $X_1$ is a hydrogen atom and Ph contains a free or functionally converted $\gamma$-carboxy-2-alkenyloxy group in the ortho or para position thereto, such allyl ether starting material, e.g. that of the formula

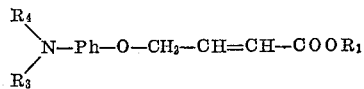

can be rearranged according to the Claisen (Cope) rearrangement procedure, for example, by heating it up to about 300° or less, to yield compounds of Formula I in which $R_3$ is lower alkenyl and Ph contains a hydroxy group ortho or para to the acid moiety, or functional acid derivatives, e.g. esters or lactones, thereof.

The substituent $X_1$ in Formula III is also the group

in which $Y_2$ is a metallic group, e.g. such as mentioned above, an ammonium group, such as tri-lower alkylammonium or di-lower alkyl-aralkylammonium, e.g. trimethylammonium dimethylbenzylammonium, or a free or reactively converted, such as esterified, etherified or salified, hydroxy group, e.g. such esterified as mentioned above, or etherified with a lower alkanol or aralkanol, or salified with an alkali or alkaline earth metal, e.g. sodium, potassium or calcium. Such metal compound, ester, ether or alcoholate of Formula III is reacted with a reactive derivative of carbonic or formic acid, whereby both reactants at most contain one metal atom. The metal or Grignard compound can be reacted with any suitable, metal free carbonic or formic acid derivative, advantageously carbon dioxide or disulfide, but also a corresponding carbonate or haloformate, e.g. diethyl carbonate or thiocarbonate; ethyl or propyl orthocarbonate; ethyl, tert. butyl, allyl, 2-methoxyethyl, 3-chloropropyl, phenyl or benzyl chloroformate; cyanogen or carbamoyl halides, e.g. cyanogen bromide or diethylcarbamoyl chloride. The starting material, in which $Y_2$ is an ammonium or free or reactively converted hydroxy group, is advantageously reacted with a metal cyanide, e.g. sodium or potassium cyanide, and that in which $Y_2$ is free, esterified or salified hydroxy, or the dehydrated unsaturated derivative thereof (wherein $X_1$ is a corresponding 1-alkenyl group), can also be reacted with carbon monoxide. The latter may be applied under neutral, basic or acidic conditions respectively, e.g. in the presence of sulfuric acid, under high pressure and/or temperature, e.g. up to 400 at and 300°, advantageously in the presence of heavy metal catalysts, e.g. nickel or cobalt salts or carbonyl derivatives thereof. The carbon monoxide may also be generated from appropriate sources, such as formic acid and high boiling mineral acids, e.g. sulfuric or phosphoric acid.

Another substituent $X_1$ is the group

wherein $Y_3$ is a substituent convertible into a free or functionally converted carboxy group. The conversion of $Y_3$ into the latter group can be performed either by oxidation or rearrangement. In the former case $Y_3$ is, for example, methyl, hydroxymethyl, borylmethyl, hydroxyiminomethyl, formyl, lower 1-alkenyl or 1-alkynyl, lower 1,2-dihydroxyalkyl or acyl, such as lower alkanoyl, alkenoyl, free or esterified carboxycarbonyl. In the corresponding starting material of Formula III, containing said potential carboxy function, $Y_3$ is transformed into free or functionally converted carboxy according to standard oxidation methods, for example, with the use of air or pure oxygen preferably in the presence of catalysts, such as silver, manganese, iron or cobalt catalysts, or with oxidation agents, e.g. hydrogen peroxide or nitric oxides, oxidizing acids of their salts, such as hypohalous, periodic, nitric or percarboxylic acids or suitable salts thereof, e.g. sodium hypochlorite or periodate, peracetic, perbenzoic or monoperphthalic acid, heavy metal salts or oxides, such as alkali metal chromates or permanganates; chromic or cupric salts, e.g. halides or sulfates thereof, or silver, mercuric, vanadium V, chromium VI or manganese IV oxide, in acidic or alkaline media respectively. In said oxidations, usually the free carboxylic acids of Formula I, or salts thereof, are obtained. However, by subjecting, for example, a hydroxyiminomethyl compound (oxime) to Beckmann rearrangement, e.g. treatment with sulfuric acid, p-toluenesulfonyl chloride or phosphorus pentachloride, or to oxidation, e.g. with hydrogen peroxide or any of said percarboxylic acids, or reacting the corresponding formyl or acyl compound (aldehyde or ketone) with hydrazoic acid according to the Schmidt reaction, e.g. in the presence of sulfuric acid, or the aldehyde with a sulfonyl- or nitro-hydroxamate, a nitrile, amide or hydroxamic acid will be formed respectively. A starting material in which $Y_3$ is free or esterified carboxycarbonyl, e.g. lower carbalkoxy carbonyl, can be converted into the acid of Formula I either by oxidation, e.g. with hydrogen peroxide in acidic media, such as mineral acids, or by decarbonylation, which preferably is carried out by pyrolysis, advantageously in the presence of copper or glass powder.

Finally, the substituent $X_1$ in Formula III may be such a moiety, which primarily is capable of liberating the required alkylidene group

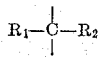

Such moiety is, for example, the free or functionally converted group

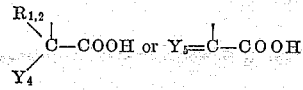

wherein each of $Y_4$ or $Y_5$ are convertible into $R_1$ and/or $R_2$ respectively, for example, by reduction, decarboxylation, deacylation or desulfurization. For example, $Y_4$ is a free or reactively esterified or etherified hydroxy or mercapto group as mentioned above, e.g. hydroxy, mercapto, chloro, bromo, iodo, benzyloxy or benzylmercapto and $Y_5$ a lower alkylidene, cycloalkylidene, cycloalkylalkylidene, oxo or thiono group. The corresponding starting material, or the quaternary o- or p-quinonmethides thereof, obtainable by splitting off $Y_4H$ from said compounds of Formula III, in which at least one of $R_1$ and $R_2$ is hydrogen, e.g. with the use of strong mineral acids or alkalis, can be reduced either with catalytically activated or nascent hydrogen, such as hydrogen in the presence of nickel, palladium or platinum catalysts, or with hydrogen generated by electrolysis or the action of metals on acids, alkalis or alcohols, such as zinc, amalgamated zinc, iron or tin on aqueous mineral or carboxylic acids, e.g. hydrochloric or acetic acid, zinc or aluminum-nickel alloys or aqueous alkali metal hydroxides, or sodium, potassium or their amalgams on lower alkanols. Also reducing and/or desulfurizing agents may be applied, depending on the starting material chosen. In case $Y_4$ is hydroxy, the reducing agent may be an aqueous suspension of phosphorus and iodine, hydriodic acid, stannous chloride or sodium sulfite or dithionite, or in case $Y_4$ is esterified hydroxy, e.g. halogeno, an aliphatic or cycloaliphatic metal compound, e.g. a corresponding $R_1$ or $R_2$ lithium or Grignard compound may be used as reducing agent. The latter metal compounds may also be applied in the reduction of said quinonmethides. In case $Y_5$ is oxo, the Clemmensen, Wolff-Kishner or Huang-Minlon procedures may be applied, wherein nascent hydrogen or hydrazine are used, the latter advantageously in the presence of strong alkalis, e.g. high boiling aqueous or glycolic sodium or potassium hydroxide solutions. In the reduction of mercapto, free or ketalized thiono compounds, desulfurization agents are advantageously applied, such as mercury or copper oxide or Raney nickel. In case $Y_4$ represents carboxy, the corresponding malonic acid derivative is decarboxylated by pyrolysis, advantageously in acidic media, or $Y_4$ stands for another acyl radical, such as lower alkanoyl or aralkanoyl, e.g. acetyl or benzoyl, the β-keto acid is subjected to acid splitting by the action of strong alkalis, e.g. those mentioned above.

Another substituent $X_1$, also providing said alkylidene group, is an unsubstituted or substituted acetyl group, e.g.

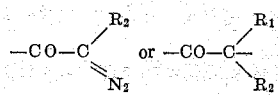

halogen. The corresponding unsubstituted acetyl starting material is converted into the compounds of the invention according to the Willgerodt-Kindler reaction, e.g. by the action of sulfur in the presence of ammonia, primary or secondary amines and advantageously of sulfonic acids, e.g. p-toluene sulfonic acid, and said substituted acetyl compounds according to the Wolff (Arndt-Eistert) reaction, e.g. by hydrolysis, alcoholysis, ammonolysis or aminolysis of corresponding α-diazoketones, advantageously while irradiated or heated in the presence of copper or silver catalysts, or according to the Favorskii (Wallach) reaction respectively, e.g. by the action of strong alkalis or soluble silver salts, such as silver nitrate, on corresponding α-haloketones.

According to process (b), the tertiary amino group

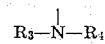

is either (α) introduced into the phenylene moiety Ph, or (β) a primary or secondary amino group, present therein, converted into the desired tertiary amino group. Accordingly, $X_2$ is, for example, a hydrogen atom, a metallic group or a free or reactively esterified hydroxy group, e.g. those groups shown above, preferably an alkali metal or halogen atom respectively. The corresponding starting material of Formula IV is reacted with the compound

in which one of $X_2$ and $Y_1$ is hydrogen or said metallic group, e.g. lithium or sodium, and the other said free or reactively esterified hydroxy group, e.g. fluorine or chlorine. In case $X_2$ is hydrogen and $Y_1$ halogen, the reaction is carried out analogous to the Friedel-Crafts syntheses mentioned above, i.e. in the presence of Lewis acids or, in case $Y_1$ is hydroxy, in the presence of alkalis, e.g. potassium hydroxide. In case $X_2$ is hydroxy or lower alkanoyloxy, the reaction is advantageously carried out in the presence of a dehydration or dehydrogenation catalyst, such as a mineral acid or a salt thereof, e.g. hydrochloric acid, ammonium sulfite or sodium bisulfite, activated aluminum oxide, Raney nickel or palladium-charcoal.

The conversion of any primary or secondary amino group $X_2$ into

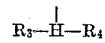

can simply be performed by transamination with the amine

The latter is advantageously used in excess and in the presence or absence of catalysts, e.g. the above-mentioned dehydration or dehydrogenation catalysts, and elevated temperature and/or pressure. A starting material of Formula IV, in which $X_2$ is primary or secondary amino, is further substituted with the use of corresponding reactively esterified alcohols or phenols, such as lower alkyl, cycloalkyl or aralkyl halides or reactive $R_4$-halides, e.g. 4-nitro-fluorobenzene, or with the use of dehydrated, unsaturated (olefinic) derivatives of the former. These condensations are advantageously carried out in the presence of acid binding agents, such as alkali metal carbonates, and the addition of the unsaturated compounds to the amino group preferably in the presence of catalysts, e.g. copper, cobalt or molybdenum catalysts, alkali metals or their hydroxides. Said amino groups $X_2$ may also be substituted by reductive alkylation, i.e. reaction with aliphatic or araliphatic aldehydes or ketones in the presence of reducing agents, e.g. formic acid or its functional derivatives, or catalytically activated hydrogen. Moreover, $X_2$ may be a corresponding acylamino group, i.e. such in which $R_3$ contains an oxo group attached to the carbon atom bound to the amino-nitrogen atom. Such acylamino group can be converted into

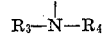

by reduction, e.g. with the use of selective reducing agents, such as boron hydride, diborane or their equivalents.

The compounds of the invention so obtained can be converted into each other according to methods known per se. For example, resulting free acids may be esterified with the corresponding alcohols in the presence of a strong acid, e.g. hydrochloric, sulfuric, benzene or p-toluene sulfonic acid, or with diazo compounds, or converted into their halides by treatment with thionyl halides or phosphorus halides or oxyhalides. Resulting esters may be hydrolyzed or transesterified in the presence of acidic or alkaline agents, e.g. mineral or complex heavy metal acids or alkali metal carbonates or alcoholates, or treated with ammonia or corresponding amines. Resulting acid halides may be treated with alcohols, ammonia or amines and resulting metal or ammonium salts with aliphatic or araliphatic halides or chlorosulfites, thionyl halides, phosphorus oxide, sulfide, halides or oxyhalides or other acyl halides in order to obtain the corresponding esters, halides, anhydrides, amides, thioamides or the nitrile respectively. Resulting amides or thioamides (Willgerodt) can be hydrolyzed under acidic or alkaline conditions, e.g. with the use of aqueous mineral and/or carboxylic acids or alkali metal hydroxides, also alcoholized, transaminated or desulfurized, e.g. with the use of mercuric oxide or alkyl halides followed by hydrolysis. Resulting nitriles likewise can be hydrolyzed or alcoholized, e.g. with the use of concentrated aqueous or alcoholic acids or alkalis or alkaline hydrogen peroxide. A resulting ester, salt or nitrile, containing in $\alpha$-position at least one hydrogen atom, can be metallized therein, e.g. with the use of alkali metals or their derivatives, such as phenyl lithium, triphenylmethyl sodium or sodium hydride, amides or alcoholates, and thereupon reacted with reactive esters of $R_1$—OH and/or $R_2$—OH. Resulting compounds may also be halogenated in the Ph-moiety, e.g. with the use of halogens, which are advantageously applied in the presence of Lewis acids, e.g. ferric, aluminum, antimony III or tin IV halides, or with the use of halogenation agents, e.g. hydrochloric acid and hydrogen peroxide or sodium chlorate, nitrosyl chloride or bromide, bromosuccin- or phthalimide. Furthermore, nitration may be applied to final products, advantageously with the use of nitric acid or nitrates under acidic conditions, e.g. in the presence of sulfuric or trifluoroacetic acid respectively. Resulting nitro compounds may be reduced, for example, with catalytically activated or nascent hydrogen and, if desired, the primary amino compounds obtained, either treated with reactive esters of corresponding alcohols or glycols, or with reactive functional acid derivatives, in order to obtain secondary, tertiary, quaternary or acylated amino compounds respectively. Said prim. amines can also be treated with nitrous acid, to yield diazonium salts; which latter can be converted according to the Sandmeyer reaction, into the corresponding hydroxy, halogeno, cyano, alkoxy or alkylmercapto compounds, e.g. by hydrolyzing the diazonium salt at elevated temperatures, or reacting it with cuprous halides or cyanide, or with a lower alkanol or alkylmercaptan respectively, preferably under neutral or slightly acidic or alkaline conditions. In resulting phenolic products, the hydroxy or mercapto group can be etherified, e.g. by reacting the corresponding alkali metal phenolates with lower alkyl or cycloalkyl halides or sulfonates, or resulting phenol ethers are hydrolyzed, e.g. with the use of strong acids or acidic salts, e.g. hydrobromic and acetic acid or pyridine hydrochloride. Finally, resulting unsaturated compounds can be hydrogenated as described above, e.g. with catalytically activated or nascent hydrogen, in order to eliminate double bonds, e.g. in the $R_2$ or amino group and/or ester moiety.

A resulting acid can be converted into its salts according to conventional methods, for example, by reacting it with an about stoichiometric amount of a suitable salt-forming reagent, such as ammonia, an amine or an alkali or alkaline earth metal hydroxide, carbonate or hydrogen carbonate. A salt of this type can be reconverted into the free acid by treatment with an acid, e.g. hydrochloric, sulfuric or acetic acid until the proper pH has been reached. A resulting basic compound can be converted into a corresponding acid addition salt, for example by reacting it with an inorganic or organic acid, such as a therapeutically useful acid, or with a corresponding anion exchange preparation, and isolating the desired salt. An acid addition salt may be converted into the free compound by treatment with a base, e.g. a metal hydroxide, ammonia or a hydroxyl ion exchange preparation. Therapeutically useful acids are, for example, inorganic acids, e.g. hydrochloric, hydrobromic, sulfuric, phosphoric, nitric, or perchloric acid, or organic acids, e.g. carboxylic or sulfonic acids, such as formic, acetic, propionic, succinic, glycollic, lactic, malic, tartaric, citric, ascorbic, maleic, hydroxymaleic, pyroracemic, phenylacetic, benzoic, 4 - aminobenzoic, anthranilic, 4 - hydroxybenzoic, salicylic, aminosalicylic, embonic, nicotinic, methanesulfonic, ethanesulfonic, hydroxyethanesulfonic, ethylenesulfonic, benzenesulfonic, halogenbenzenesulfonic, toluenesulfonic, naphthalenesulfonic and sulfanilic acid; methionine, tryptophan, lysine or arginine.

These or other salts, for example, the picrates, can also be used for purification of the bases obtained; the bases are converted into salts, the salts are separated and the bases are liberated from the salts. In view of the close relationship between the free compounds and the compounds in the form of their salts, whenever a compound is referred to in this context, a corresponding salt is also intended, provided such is possible or appropriate under the circumstances.

Resulting mixtures of isomers can be separated into the single isomers by methods in themselves known, e.g. by fractional distillation, crystallization and/or chromatography. Racemic products can likewise be resolved into the optical antipodes, for example by separation of a diastereomeric salts thereof, e.g. by the fractional crystallization of d- or l-tartrates or d-$\alpha$-(phenyl or 1-naphthyl)-ethylamine or 1-cinchonidine salts.

The above reactions are carried out according to standard methods, in the presence or absence of diluents, preferably such as are inert to the reagents and are solvents thereof, of catalysts condensing or neutralizing agents and/or inert atmospheres, at low temperatures, room temperature or elevated temperatures, at atmospheric or superatmospheric pressure.

The invention also comprises any modification of the above process, wherein a compound resulting as an intermediate at any stage thereof, is used as starting material and the remaining steps are carried out or the process is discontinued at any stage thereof, or in which the starting material is formed under the reaction conditions or is used in the form of its salts or reactive derivatives. For example, in most of the above-described oxidation methods, wherein $Y_3$ is converted into a free or functionally converted carboxy group, the corresponding aldehydes ($Y_3$ is formyl) are formed intermediarily. According to the haloform reaction ($Y_3$ is acetyl) intermediarily formed trihaloketones are hydrolyzed under the applied alkaline conditions, to yield the corresponding salts or esters of the acids of Formula I. Also, the quaternary o- or p-quinonmethides may be formed intermediarily from the corresponding starting material in which $Y_4$ is free or reactively esterified hydroxy, e.g. under strongly acidic or alkaline conditions, or during the reduction of compounds in which $Y_5$ is oxo or thiono. The α-diazoketones are usually formed, according to Arndt-Eistert, from the corresponding benzoic acid halides and aliphatic or cycloaliphatic ($R_2$) diazo compounds, whereupon the above-described Wolff rearrangement is performed. Finally, in the various reductions mentioned above, especially those of the quinonmethides, overreduction may occur, to yield products of Formula I, or functional derivatives thereof, wherein Ph is a corresponding cyclohexylene, cyclohexenylene or cyclohexadienylene radical. Such compounds, which also could be prepared from different sources, can be dehydrogenated either by pyrolysis in the presence of catalysts, e.g. the above-mentioned hydrogenation catalysts, or with the use of dehydrogenation agents, such as sulfur, selenium or derivatives thereof, e.g. dialkylsulfides or selenium dioxide, quinones, e.g. chloranil, and the like. In the process of the invention, those starting materials are preferably used, which lead to those compounds of the invention which are indicated above as the preferred embodiments of the invention.

The starting material used is known or, if new, may be prepared according to the methods described for known analogs thereof. For example, compounds of Formula III can be prepared analogous to the process mentioned under item (b), i.e. by introduction or construction of the tert. amino group

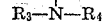

In case $X_1$ is a reactively esterified hydroxy group, it may also be introduced either by halogenation, or nitration followed by reduction, diazotization and Sandmeyer reaction. The resulting starting material may be subsequently converted into the metallic compounds, e.g. by reaction with alkali or alkaline earth metals, such as lithium or magnesium, or with dialkyl zinc or cadmium. The allyl ethers for the Claisen rearrangement can be prepared analogous to those described in J. Chem. Soc., 4210 (1963).

The starting material in which $Y_2$ is a metallic group may be prepared as shown above, i.e. by reacting reactive esters of the corresponding benzylalcohols with alkali or alkaline earth metals or dialkyl zinc or cadmium. Otherwise, according to Friedel-Crafts, easily obtainable linear or cyclic alkano- or alkenophenones

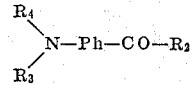

may be reduced either with lithium aluminum hydride or with $R_1$-magnesium halides, or

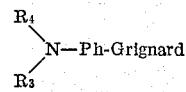

compounds reacted with $R_1$—CO—$R_2$, to yield the corresponding benzyl alcohols, whose hydroxy group may be reactively esterified or salified according to well-known methods, e.g. by reaction with phosphorus, thionyl or sulfonyl halides, alkali or alkaline earth metals respectively and the resulting esters or salts may be converted into ethers either by reaction with alcoholates or reactive esters respectively. The compounds in which $Y_2$ is an ammonium group, can be obtained from the former reactive esters and secondary amines and the resulting tertiary amines are quaternized in the usual manner, e.g. by reaction with lower alkyl or aralkyl halides.

The starting material containing $Y_3$ can be obtained from the former compounds in which $Y_2$ is a metallic group, by reacting them with a methyl halide, formaldehyde, a formyl halide, lower alkanal, alkenal or hydroxyalkanal or a lower alkanoyl, alkenoyl or oxalyl halide respectively and, if desired, dehydrating resulting alcohols by the action of acidic agents, e.g. sulfuric acid or phosphorus pentoxide, to yield unsaturated derivatives thereof. The latter, e.g. methylidene compounds, may be reacted with boranes in order to obtain borylmethyl compounds and aldehydes with hydroxylamine, to yield the hydroxyiminomethyl compounds (oximes). The aldehydes, i.e. compounds in which $Y_3$ is formyl, can also be obtained from said ketones

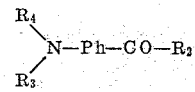

by reaction with dimethylsulfoniummethylide or dimethyloxysulfoniummethylide (generated from the corresponding trimethylsulfonium salts) and rearranging the resulting ethyleneoxides to the corresponding aldehydes by the action of Lewis acids, e.g. p-toluene sulfonic acid or boron trifluoride, or according to the Darzens condensation by reacting the above ketones with α-halo-alkanoic or alkenoic acid esters in the presence of alcoholates, e.g. potassium tert. butoxide, saponifying the glycidic esters formed and rearranging and decarboxylating them, advantageously in acidic media, e.g. sulfuric acid.

The starting material containing $Y_4$, which represents free, esterified or etherified hydroxy or mercapto, can be prepared according to the cyanohydrin or analog syntheses, e.g. by reaction of compounds

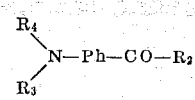

or their thiono analogs, with aqueous potassium cyanide under acidic conditions and, if desired, converting resulting nitriles into other acid derivatives and/or alcohols into corresponding mercapto compounds or reactive esters or ethers thereof, or dehydrating them to unsaturated derivatives. The compounds in which $Y_5$ is oxo or thiono can be obtained according to Friedel-Crafts with the use of suitable

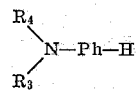

compounds and oxalyl halides. The resulting phenylglyoxylic acid esters may then be reduced with $R_2$-Grignard compounds, if desired, followed by dehydration. Said compounds may also be prepared according to the Ando synthesis by reaction with mesoxalates in the presence of stannic chloride. The resulting adduct can either be hydrogenated, the malonate formed metallized and reacted with a reactive ester of $R_2$—OH or saponified and decarboxylated.

Finally the α-diazoketones are obtained from corresponding benzoic acid halides and $R_2$-diazo compounds and the α-haloketones by halogenating of the corresponding alkanophenones or reacting the former α-diazoketones with hydrohalic acids. The starting material of Formula IV is prepared analogous to the process mentioned under item (a), by selecting starting materials containing $X_2$ or a group capable of being converted into $X_2$, advantageously nitro, instead of

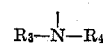

The pharmacologically active compounds of the invention are useful in the manufacture of pharmaceutical compositions containing an effective amount thereof in conjunction or admixture with excipients suitable for either enteral, parenteral or topical application. Preferred are tablets and gelatin capsules comprising the active ingredient together with (a) diluents, e.g., lactose, dextrose, sucrose, mannitol, sorbitol, cellulose and/or glycine, (b) lubricants, e.g. silica, talcum, stearic acid, its magnesium or calcium salt and/or polyethyleneglycol, for tablets also (c) binders, e.g. magnesium aluminum silicate, starch paste, gelatin, tragacanth, methylcellulose, sodium carboxymethylcellulose and/or polyvinylpyrrolidone, if desired, (d) disintegrants, e.g. starches, agar, alginic acid or its sodium salt, enzymes of the binders or effervescent mixtures and/or (e) adsorbents, colorants, flavors and sweeteners. Injectable compositions are preferably aqueous isotonic solutions or suspensions, and suppositories or ointments are advantageously fatty emulsions or suspensions. They may be sterilized and/or contain adjuvants, such as preserving, stabilizing, wetting or emulsifying agents, solution promoters, salts for regulating the osmotic pressure and/or buffers. Said pharmaceutical compositions may also contain other therapeutically valuable substances. They are prepared according to conventional mixing, granulating or coating methods respectively and contain about 0.1 to 75%, preferably about 1 to 50% of the active ingredient.

The following examples are intended to illustrate the invention and are not to be construed as being limitations thereon. Temperatures are given in degrees centigrade, and all parts wherever given are parts by weight.

EXAMPLE 1

The mixture of 5.65 g. 4-N-methyl-N-phenylaminoacetophenone, 15 ml. morpholine and 2 g. sulfur is refluxed for 12 hours and evaporated in vacuo. The residue is taken up in ethanol, the solution filtered and evaporated, to yield the 4-N-methyl-N-phenyl-aminophenyl-thioacetmorpholide of the formula

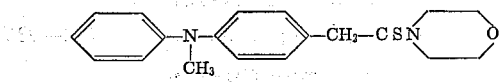

showing in the U.V. spectrum a $\lambda_{max.}=246$ (9,490) and 294 (12,780) and $\lambda_{min.}=228$ (6,220) and 262 (5,460) in methanol.

EXAMPLE 2

The mixture of 5 g. 4-N-methyl-N-phenylaminophenylthioacetomorpholide and 50 ml. 25% potassium hydroxide in ethylene glycol-water (1:2) is heated on the steam cone overnight. It is evaporated in vacuo, the residue taken up in water, the mixture washed with diethyl ether, the aqueous phase acidified with concentrated hydrochloric acid and extracted with diethyl ether. The extract is washed with 10% aqueous potassium bicarbonate, the aqueous solution separated, again acidified with concentrated hydrochloric acid and extracted with diethyl ether. The extract is washed with water, dried, evaporated and the residue recrystallized from diethyl ether-petroleum ether, to yield the 4-N-methyl-N-phenylaminophenylacetic acid of the formula

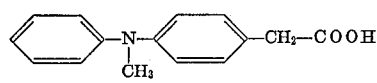

melting at 93–95°.

EXAMPLE 3

To the solution of 5.6 g. 4-N-methyl-N-phenylaminophenylacetic acid in 100 ml. diethyl ether, a saturated solution of diazomethane in diethyl ether is added dropwise while stirring, until the yellow color persists. The mixture is allowed to stand at room temperature for 2 hours, washed with 5% aqueous sodium bicarbonate, dried, filtered, evaporated, the residue distilled and the fraction boiling at 165–175°/0.1 mm. Hg collected, to yield the methyl 4-N-methyl-N-phenylaminophenyl-acetate of the formula

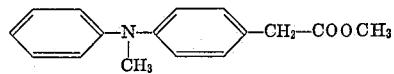

EXAMPLE 4

The solution of 3.9 g. methyl 4-N-methyl-N-phenylaminophenyl-acetate in 18 ml. diethyl ether is added dropwise to the gray mixture prepared from 0.58 g. sodium, 100 ml. liquid ammonia and 2 crystals ferric nitrate nonahydrate while stirring, and stirring is continued for 1 hour. Hereupon the solution of 6.8 g. methyl iodide in 10 ml. diethyl ether is added dropwise and stirring is continued for 1 hour. The mixture is allowed to evaporate overnight, the residue taken up in water and the mixture extracted with methylene chloride. The extract is washed with brine, dried and evaporated, to yield the methyl α-(4 - N-methyl-N-phenylaminophenyl)-propionate of the formula

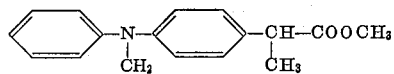

showing in the U.V. spectrum a $\lambda_{max.}=247$ (8,680) and 292 (15,030) and a $\lambda_{min.}=231$ (6,290) and 261 (5,950) in methanol.

EXAMPLE 5

The solution of 1.3 g. methyl α-(4-N-methyl-N-phenylaminophenyl)-propionate in the minimum amount of ethanol is added to 25 ml. 2 N aqueous potassium hydroxide, the mixture heated at the steam bath for about 3 hours and slowly evaporated. The residue is taken up in water, the solution acidified with concentrated hydrochloric acid, the mixture extracted with diethyl ether, the ethereal layer washed with water and extracted with 10% aqueous potassium bicarbonate. The aqueous solution is acidified with 3 N hydrochloric acid, extracted with diethyl ether, the extract dried, filtered and evaporated. The residue is taken up in the minimum amount of methylene chloride, the solution poured on a column of 20 g. silica gel, which is eluted with 800 ml. methylene chloride. The eluate is evaporated and the residue recrystallized from diethyl ether-petroleum ether, to yield the α-(4-N-methyl - N - phenylaminophenyl)-propionic acid of the formula

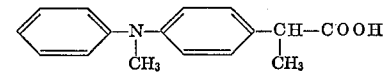

melting at 81–83°.

EXAMPLE 6

Preparation of 10,000 tablets each containing 50.0 mg. of the active ingredient:

| Formula— | G. |
| --- | --- |
| 4 - N-methyl-N-phenylaminophenyl-acetic acid | 500.00 |
| Lactose | 1,706.00 |
| Corn starch | 90.00 |
| Polyethylene glycol 6,000 | 90.00 |
| Talcum powder | 90.00 |
| Magnesium stearate | 24.00 |
| Purified water, q.s. | |

Procedure.—All the powders are passed through a screen with openings of 0.6 mm. Then the drug substance, lactose, talcum, magnesium stearate and half of the starch are mixed in a suitable mixer. The other half of the starch is suspended in 45 ml. water and the suspension added to the boiling solution of the polyethylene glycol in 180 ml. water. The paste formed is added to the powders which are granulated, if necessary, with an additional amount of water. The granulate is dried overnight at 35°, broken on a screen with 1.2 mm. openings and compressed into tablets using concave punches with 7.1 mm. diameter, uppers bisected.

EXAMPLE 7

Preparation of 10,000 tablets each containing 10.0 mg. of the active ingredient:

| Formula— | G. |
|---|---|
| α-(4 - N - methyl-N-phenylaminophenyl)-propionic acid | 100.00 |
| Lactose | 1,157.00 |
| Corn starch | 75.00 |
| Polyethylene glycol 6,000 | 75.00 |
| Talcum powder | 75.00 |
| Magnesium stearate | 18.00 |
| Purified water, q.s. | |

Procedure.—All the powders are passed through a screen with openings of 0.6 mm. Then the drug substance, lactose, talcum, magnesium stearate and half of the starch are mixed in a suitable mixer. The other half of the starch is suspended in 40 ml. water and the suspension added to the boiling solution of the polyethylene glycol in 150 ml. water. The paste formed is added to the powders which are granulated, if necessary, with an additional amount of water. The granulate is dried overnight at 35°, broken on a screen with 1.2 mm. openings and compressed into tablets using concave punches with 6.4 mm. diameter, uppers bisected.

EXAMPLE 8

According to the method described in the previous examples, the following compounds are prepared from equivalent amounts of the corresponding starting materials:

(1) α-Cyclopentyl-α-[4-N-methyl-N-(4-methoxyphenylamino)-phenyl]-acetic acid
(2) α-(3-chloro-4-N-methyl-N-phenylaminophenyl)-propionic acid
(3) 4-sec.butyl-3-N-(2-hydroxyethyl)-N-phenylaminophenyl-acetic acid
(4) 4-N-(3-dimethylaminopropyl)-N-(4-chlorophenyl)-aminophenyl-acetic acid
(5) β-Cyclopropyl-α-(4-N-methyl-N-phenylaminophenyl)-propionic acid
(6) 4-N-(2-furyl)-N-(2-methoxyethyl)-aminophenyl-acetic acid
(7) 3-N-cyclohexyl-N-phenylamino-4-methoxyphenyl-acetic acid
(8) 3-chloro-4-N-(2-hydroxyethyl)-N-4-anisylaminophenyl acetic acid
(9) α-(3-amino-4-N-methyl-N-phenylaminophenyl)-propionic acid
(10) α-(3-acetylamino-4-N-methyl-N-3-tolylaminophenyl)-propionic acid
(11) 4-cyano-3-N-methyl-N-phenylaminophenyl-acetic acid
(12) 4-carboxy-3-N-methyl-N-phenylaminophenyl-acetic acid
(13) 3-sulfamoyl-4-N-(2-hydroxyethyl)-N-phenylaminophenyl-acetic acid
(14) 4-N-(2-methoxyethyl)-N-(4-chlorophenyl)-aminophenyl-acetic acid

EXAMPLE 9

The mixture of 6 g. 4-N-ethyl-N-phenylamino-acetophenone, 15 ml. morpholine, 0.1 g. p-toluene sulfonic acid and 2 g. sulfur is refluxed overnight and evaporated in vacuo. The residue is taken up in ethanol, the solution filtered and evaporated, to yield the 4-N-ethyl-N-phenylaminophenyl-thioacetmorpholide. The mixture of 5 g. thereof and 50 ml. 25% potassium hydroxide in ethylene glycol-water (1:2) is heated on the steam cone overnight. It is evaporated in vacuo, the residue taken up in water, the mixture washed with diethyl ether, the aqueous phase acidified with concentrated hydrochloric acid and extracted with diethyl ether. The extract is washed with 10% aqueous potassium bicarbonate, the aqueous solution separated, again acidified with concentrated hydrochloric acid and extracted with diethyl ether. The extract is washed with water, dried, evaporated and the residue recrystallized from diethyl ether-petroleum ether, to yield the 4-N-ethyl-N-phenylaminophenyl-acetic acid of the formula

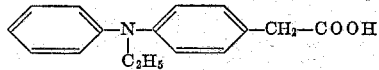

showing in the I.R. spectrum strong bands at 694 and 1706 cm.$^{-1}$.

The starting material is prepared as follows: The mixture of 3 g. 4-fluoroacetophenone, 5 g. N-ethyl-aniline and 8 ml. dimethylsulfoxide is refluxed for 4 days and poured into water. The mixture is extracted with diethyl ether, the extract washed with water and aqueous acetic acid, dried, filtered and evaporated, to yield the 4-N-ethyl-N-phenylamino-acetophenone.

What is claimed is:
1. A compound of the formula

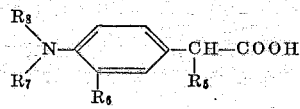

in which $R_5$ is cyclopropyl, $R_6$ is hydrogen or chloro, $R_7$ is methyl or ethyl and $R_8$ is phenyl, tolyl, anisyl or chlorophenyl, or the methyl or ethyl ester, the ammonium salt, an alkali metal salt or a therapeutically useful acid addition salt thereof.

2. A compound as claimed in claim 1 and being the β-cyclopropyl-α-(4-N-methyl-N-phenylaminophenyl) - propionic acid.

References Cited
UNITED STATES PATENTS
3,549,690  12/1970  Leigh et al. _____ 260—519

LORRAINE A. WEINBERGER, Primary Examiner

L. A. THAXTON, Assistant Examiner

U.S. Cl. X.R.

260—243 B, 247.2 R, 268 R, 293.78, 295 R, 326.85, 347.3, 404, 404.5, 465 D, 471 R, 516, 518 A, 519, 558 A, 559 D, 309, 319